US007885832B2

(12) United States Patent
Collins et al.

(10) Patent No.: US 7,885,832 B2
(45) Date of Patent: Feb. 8, 2011

(54) INSURANCE POLICY AND METHOD FOR PROVIDING AN INSURANCE POLICY HAVING DORMANCY FEATURES

(75) Inventors: Richard Alexander Collins, Indianapolis, IN (US); Steven Louis Pollack, Westfield, IN (US); Darrell Steven Richey, Indianapolis, IN (US)

(73) Assignee: Golden Rule Insurance Company, Indianapolis, IN (US)

( * ) Notice: Subject to any disclaimer, the term of this patent is extended or adjusted under 35 U.S.C. 154(b) by 0 days.

(21) Appl. No.: 11/537,936

(22) Filed: Oct. 2, 2006

(65) Prior Publication Data

US 2008/0082370 A1 Apr. 3, 2008

(51) Int. Cl.
*G06Q 10/00* (2006.01)
*G06Q 50/00* (2006.01)
*G06Q 40/00* (2006.01)
*A61B 5/00* (2006.01)
*G06F 19/00* (2006.01)

(52) U.S. Cl. .................................. 705/4; 705/2; 705/3
(58) Field of Classification Search .................... 705/2, 705/3, 4
See application file for complete search history.

(56) References Cited

U.S. PATENT DOCUMENTS

| | | | | |
|---|---|---|---|---|
| 4,766,539 A | * | 8/1988 | Fox | 705/4 |
| 4,916,611 A | | 4/1990 | Doyle, Jr. et al. | |
| 5,070,452 A | | 12/1991 | Doyle, Jr. et al. | |
| 5,754,980 A | * | 5/1998 | Anderson et al. | 705/4 |
| 5,839,113 A | * | 11/1998 | Federau et al. | 705/4 |
| 5,855,005 A | * | 12/1998 | Schuler et al. | 705/4 |
| 6,064,970 A | * | 5/2000 | McMillan et al. | 705/4 |
| 6,868,386 B1 | * | 3/2005 | Henderson et al. | 705/4 |
| 7,124,088 B2 | * | 10/2006 | Bauer et al. | 705/4 |
| 7,469,215 B2 | * | 12/2008 | Kwan | 705/4 |
| 2002/0049617 A1 | * | 4/2002 | Lencki et al. | 705/4 |
| 2002/0055861 A1 | * | 5/2002 | King et al. | 705/4 |
| 2002/0194117 A1 | * | 12/2002 | Nabe et al. | 705/38 |
| 2003/0033173 A1 | | 2/2003 | Suzuki et al. | |
| 2003/0139948 A1 | * | 7/2003 | Strech | 705/4 |
| 2003/0195769 A1 | | 10/2003 | Francis | |
| 2003/0204421 A1 | * | 10/2003 | Houle et al. | 705/4 |
| 2004/0039609 A1 | | 2/2004 | Burkitt | |
| 2004/0148202 A1 | * | 7/2004 | Siefe et al. | 705/4 |
| 2005/0187872 A1 | | 8/2005 | Schmidt et al. | |

(Continued)

OTHER PUBLICATIONS

Causey, M., "The Added Cost of Buyouts: [Final Edition]", *The Washington Post*, Washington, D.C ., p. D2, Aug. 14, 1996.

(Continued)

*Primary Examiner*—Gerald J. O'Connor
*Assistant Examiner*—Amber Altschul
(74) *Attorney, Agent, or Firm*—Dorsey & Whitney LLP (57) ABSTRACT

An insurance policy having a dormancy provision is provided in which the dormancy provision enables a policyholder to activate and deactivate benefits provided under the insurance policy. Also provided is a method for enabling a holder of an insurance policy with a dormancy provision to activate and deactivate benefits of an insurance policy, and includes purchasing an insurance policy having a dormancy provision and a set of associated benefits, paying premiums to maintain the set of benefits in an active state, deactivating the set of benefits; paying dormancy premiums to maintain the set of deactivated benefits in a deactivated state, and reactivating the set of deactivated benefits.

18 Claims, 3 Drawing Sheets

U.S. PATENT DOCUMENTS

2005/0288970 A1* 12/2005 Holcom et al. ................. 705/4
2006/0074724 A1 4/2006 Schwartz et al.

OTHER PUBLICATIONS

"Disclosure; Estoppel, Equitable Relief, Attorney Fees", *Benefits Quarterly* (Brookfield), vol. 18, No. 13, pp. 81(3), Third Quarter 2002.

Lassila, D.R., "Cafeteria Plans Need to Harmonize With FMLA Mandates", *Practical Tax Strategies* (Boston), vol. 70, No. 3 pp. 164 (7), Mar. 2003.

Lankford, K., "Keep Covered", *Kiplinger's Personal Finance* (Washington), vol. 58, No. 9, pp. 87-88, Sep. 2004.

* cited by examiner

Data Page — 200

Policy Number – 055-055-012
Insured – John Doe
Plan – Two Parent Family
Total Premium – N/A
Date: November 30, 2011

Premium Mode – Quarterly
First Renewal Date – June 1, 2002
Insured Health Class – Standard
Total Maintenance Fee - $20.00

---

Name of Insured: [John Doe]
Policy Effective Date – May 1, 2006

Effective Date for Illnesses – Inactive Status
Effective Date for Injuries – Inactive Status

History:
Activation Date:
May 1, 2006
January 1, 2009

Deactivation Date:
July 30, 2007
November 30, 2011

---

Dependent Name: [Dependent No. 1]
Policy Effective Date – May 1, 2006

Effective Date for Illnesses – Inactive Status
Effective Date for Injuries – Inactive Status

History:
Activation Date:
May 1, 2006

Deactivation Date:
May 1, 2006

---

Dependent Name: [Dependent No. 2]
Policy Effective Date – May 1, 2006

Effective Date for Illnesses – Inactive Status
Effective Date for Injuries – Inactive Status

History:
Activation Date:
May 1, 2006

Deactivation Date:
July 30, 2007

---

Dependent Name: [Dependent No. 3]
Policy Effective Date – March 10, 2009

Effective Date for Illnesses – Inactive Status
Effective Date for Injuries – Inactive Status

History:
Activation Date:
March 10, 2009

Deactivation Date:
November 30, 2011

---

[INSERT INFORMATION REGARDING DEDUCTIBLE AMOUNTS AND BENEFITS HERE]

FIG. 3

Data Page    300

Policy Number – 055-055-012
Insured – John Doe
Plan – Two Parent Family
Total Premium – $500.00
Date: August 15, 2012

Premium Mode – Quarterly
First Renewal Date – June 1, 2002
Insured Health Class – Standard
Total Maintenance Fee – N/A

---

Name of Insured: [John Doe]
Policy Effective Date – May 1, 2006

Effective Date for Illnesses – August 15, 2012
Effective Date for Injuries – August 15, 2012

History:
Activation Date:
May 1, 2006
January 1, 2009
August 15, 2012

Deactivation Date:
July 30, 2007
November 30, 2011

---

Dependent Name: [Dependent No. 1]
Policy Effective Date – May 1, 2006

Effective Date for Illnesses – Inactive Status
Effective Date for Injuries – Inactive Status

History:
Activation Date:
May 1, 2006

Deactivation Date:
May 1, 2006

---

Dependent Name: [Dependent No. 2]
Policy Effective Date – May 1, 2006

Effective Date for Illnesses – Inactive Status
Effective Date for Injuries – Inactive Status

History:
Activation Date:
May 1, 2006

Deactivation Date:
July 30, 2007

---

Dependent Name: [Dependent No. 3]
Policy Effective Date – March 10, 2009

Effective Date for Illnesses – August 15, 2012
Effective Date for Injuries – August 15, 2012

History:
Activation Date:
March 10, 2009
August 15, 2012

Deactivation Date:
November 30, 2011

---

[INSERT INFORMATION REGARDING DEDUCTIBLE AMOUNTS AND BENEFITS HERE]

INSURANCE POLICY AND METHOD FOR PROVIDING AN INSURANCE POLICY HAVING DORMANCY FEATURES

BACKGROUND

In order to defray the costs of health care, individuals, families, and other entities (such as employers) routinely purchase health insurance policies, certificates or contracts (individually or collectively a "policy"). Generally, health insurance policies provide that, in exchange for the policyholder's payment of a premium, the health insurance company will cover some or all of the health care costs incurred by the individuals covered under the policy.

Other types of insurance coverage, such as life and property insurance function in similar fashion, wherein the policyholder pays a premium and the insurance company covers some or all of the costs insured under the terms of the policy.

It is not unusual for individuals, families and other entities to change insurance coverage over time. For example, an individual may purchase a first health insurance policy to obtain coverage when the individual becomes a legal adult and is no longer covered under his or her parents' insurance policy. Later, the individual may become employed and obtain health insurance coverage under the employer's policy. Subsequently, the individual may change jobs, move to another location, or make other changes that necessitate or make desirable yet another change in health insurance policies. Similar changes may occur in the individual's other types of insurance policies, such as life and property insurance.

Typically, when an insured entity, such as an individual, family or company, switches insurance carriers or policies, the insured entity cancels the previous insurance policy to avoid paying unnecessary and duplicative insurance premiums. However, as time passes, the entity's circumstances may change. For example, a single healthy adult age 25 may purchase a health insurance policy. The adult may then get a job and obtain health insurance through the employer. Over time, the individual may get married, have children, or develop a chronic or other health condition. The individual may then cease to work for the employer, leaving the individual with only extremely expensive or no health insurance options, during the COBRA term or after COBRA has expired.

In view of this and other situations in which an insured entity's circumstances and insurance needs vary over time, there is a need for a policy that provides flexibility in coverage to the policyholder as the insurance needs of the policyholder vary.

SUMMARY

The present invention provides for a policy containing a dormancy provision that enables an insured entity to vary the scope and terms of coverage, including making the coverage go dormant for one or more periods of time. The dormancy provision provides flexibility by enabling an insured entity to maintain the option of coverage under a first policy even while the entity is insured under a different second policy by paying just a portion of the premium for the first policy, such as a dormancy premium, to maintain the option of reactivating coverage under the first policy should such coverage be needed, for example if coverage under the second policy terminates. The dormancy provision also provides portability by allowing the policyholder to make life changes while maintaining the option of activating or deactivating benefits under the policy. Further, the dormancy provision also addresses the issue of uninsurability by providing the policyholder with the assurance that they will be insured even if circumstances arise that would normally serve as a contraindication for coverage. The dormancy provision may be implemented in any type of policy, including but not limited to, health, life, or property insurance policies.

For example, in the context of health insurance, a single healthy female purchases a medical insurance policy with a dormancy provision and then makes her plan benefits go dormant after she becomes insured under her employer's insurance plan. During this time she is married and has a child. Subsequently, she decides to quit her job and activate the benefits under her policy. According to certain embodiments, the policyholder has the right to activate the benefits under her policy, but the right may be subject to some requirements that may include: 1) continuity of payment of the policy premiums on a timely basis; 2) timely notification of desire to deactivate benefits under the policy, e.g., a gap of no more than a specified time between commencement of coverage under employer's insurance plan and notification to deactivate benefits under the policy; and 3) timely notification of desire to activate benefits, i.e., a gap of no more than a specified time (e.g. 62 days) between loss of coverage from her employer's plan and notification of reactivation of the policy. Once dormant benefits under the policy are activated, the policyholder pays insurance premiums under her plan as if she had been paying her premiums all along.

In certain embodiments, a child and/or a husband may receive coverage under the policy having the dormancy provision. In this embodiment, when reactivating dormant benefits under a policy, a policyholder adding dependents may pay a family rate or an individual plus dependent rate.

In other embodiments, a child and/or a husband may receive coverage under their own policy. In this embodiment, if the dependent would be guaranteed coverage under the policyholder's policy, (for example, if the dependent was a newborn and the insurance company was notified of the newborn's birth within a specified period of time) he would be issued his own policy without being underwritten.

However, there may be some prerequisites to activation of the benefits under a policy when adding coverage for the child, and may include: that the policyholder's benefits be in an active state, notification of birth within a certain period of time and payment of associated premiums for the dependent, or underwriting for the child if notification is not received within a predefined period of time. The child may also receive his own policy rather than being added to his parent's policy.

Prerequisites to activation of the dormant policy with coverage for the husband may include: underwriting before being added to the policy. The husband may also buy his own dormancy policy, or he could be declined for coverage.

Once a dependent is added to the policy, they may be subject to the same activation/deactivation requirements as anyone under the policy.

In another example, a spouse may have a preexisting condition and may desire to be added as a dependent under his spouse's policy having a dormancy provision. In some embodiments, in order to be added to the policy, a husband may be subjected to a waiting period before receiving benefits for services relating to the preexisting condition. In certain embodiments, if the spouse is added to the policy at a time in which the insurance benefits are dormant (for example, the couple gets married, but the wife is covered under an employer-sponsored program so she has deactivated her insurance benefits under her dormancy policy), the waiting period for his preexisting condition will begin to run as of the date spouse was added to the dormant policy. If the wife activates her benefits 18 months later, the husband may immediately receive benefits for services related to that preexisting condition because the waiting period may have expired since the date he was added to the policy.

In another embodiment involving a medical insurance policy having a dormancy provision, a single healthy male buys a dormancy policy and makes his benefits go dormant once he is insured under his employer's health plan. During this time he develops diabetes. If he qualifies to activate the benefits of the dormant policy, his premium rates remain on the same schedule as if he'd always received benefits.

In some embodiments, a policyholder may be allowed to activate his insurance benefits only within so many days of a qualifying event, and/or he must have been covered under other medical insurance within a certain period prior to activating his insurance benefits under the dormancy policy. Requiring that a policyholder have other existing medical insurance while the dormancy policy benefits are dormant may ensure that a healthy person does not deactivate his benefits under the dormancy policy and only pay dormancy premiums until he needs the benefits under the dormancy policy, e.g. when the policy holder becomes ill.

Embodiments of the present invention provide benefits to policyholders because those who pay dormancy premiums for dormant insurance benefits under their policies do not reapply for coverage when activating their policy benefits. This may also provide an added cost benefit because the policyholder pays the premium that would apply if they had been insured during dormancy periods, which will likely be lower than what the premium would be if the policyholder had to reapply and disclose various medical conditions not present at the policy's inception. Thus, premiums will change with attained age and according to normal and periodic rate adjustments applied to all similarly situated insureds, but not due to the development of illness or disease during the period of dormancy.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Overview

Certain embodiments of the invention provide a policy with a dormancy provision or a dormancy rider, right or insurance policy provision that meets policyholders' shifting insurance coverage needs over their lifetime despite potential life changes over time. The dormancy feature of the present invention may be created through language included within a policy, or by language within an attached rider. A rider attaches to an existing policy and operates to delete, add, or to delete and replace, i.e., modify, specific provisions within the policy it attaches to. Insurance policies having a dormancy provision or right, or a dormancy rider, herein "dormancy provision", according to certain embodiments, gives a policyholder the option to activate and deactivate insurance benefits under the policy.

For the purposes of certain embodiments of the present invention, a policy is composed of features, terms and conditions of a typical policy, except where the policy would be affected by a dormancy provision.

Further, for purposes of certain embodiments of the present invention, a policyholder may include an individual, a corporation, an association, or another qualified group where members are eligible to receive benefits and may individually select the dormancy feature when another member may not.

Figure 1:
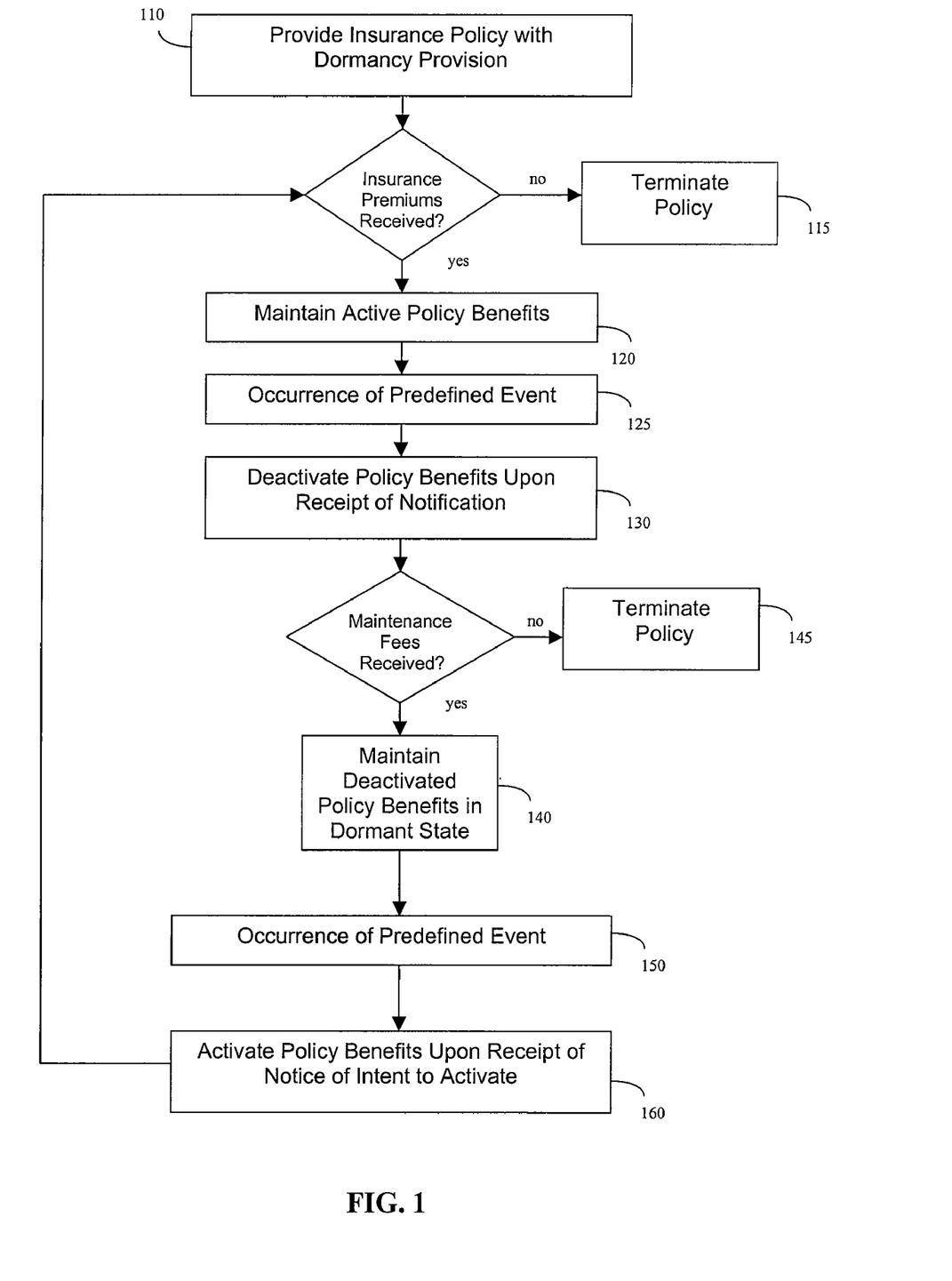
FIG. 1 depicts a method for providing a policy having a dormancy provision.

FIG. 1 depicts a flow chart of a method 100 for providing a policy having a dormancy provision. According to FIG. 1, a policy with a dormancy provision is initially issued 110 in an active status to an individual with no other coverage. The policy is maintained though payment of premiums related to both the policy's dormancy provision and the underlying insurance benefits. In this state, the insurance company is responsible for covering reimbursement costs for benefits defined in the policy. Collection of insurance premiums keeps the policy in force and maintains 120 the active policy. If premiums are not received within a defined period of time, the policy terminates 125.

The active policy may remain active or may be deactivated upon the occurrence of one or more predefined events 125. For example, a predefined event may include change in employment status and/or other insurance becoming available.

Subsequently, if the insurance company receives a deactivation notification from the policyholder after the occurrence of one or more predefined events 125, the policy benefits are deactivated 130. Notification by a policyholder to deactivate insurance benefits may include providing written notification of intent to pay dormancy premiums under the policy. When benefits are in the dormant state, they are not available to the policyholder, and according to some embodiments, not available for dependents.

In some embodiments, a policyholder may deactivate his insurance benefits at any time. In other embodiments, the policy may include provisions requiring that deactivation of benefits not be earlier than a date the insurance company receives such a request. Further, in some embodiments, a policyholder may be allowed to deactivate his insurance benefits retroactively.

According to some embodiments, before a policyholder may be allowed to deactivate the benefits under his policy, proof of other insurance coverage may be required. In addition or alternatively, a minimum waiting period may be required before deactivating policy benefits having an active status at issue.

Once deactivated, the dormancy aspect of the policy provides the individual with an opportunity to activate their benefits. The dormant policy is maintained in the inactive status as long as dormancy premiums are collected 140. Otherwise, in the event that dormancy premiums are not paid, the policy terminates 145.

As set forth in FIG. 1, the occurrence 150 of one or more predefined events is required before the policyholder may be permitted to activate his policy benefits. Predefined events permitting activation of insurance benefits may include the first day a policyholder is approved under the policy, when the policyholder no longer has coverage under other previously existing insurance coverage, upon the birth of a child, for that child, if the policyholder's benefits are active, or after the policy benefits are maintained in the dormant state for a predetermined period of time.

In some embodiments, when a predefined event occurs, the dormant insurance benefits may be activated upon notification. Notification may include, for example, payment of premiums by the policyholder and/or written notification from the policyholder or other entity. In certain embodiments, notice of intent to activate the dormancy policy may be required within a certain time period, e.g., 30 or 60 days, after the occurrence of one of the predefined events. Once notice is received, the policy is activated 160, and as long as insurance premiums are paid to the insurance company, the policy and its associated benefits are maintained in an active state 120.

Although the embodiment in FIG. 1 involves a policy having a dormancy provision issued with insurance benefits in an active state, a policy with a dormancy provision may be issued to a policyholder where the benefits are in an initial dormant state. For example, in one embodiment, a policy is issued to a policyholder with other existing insurance coverage, and benefits under the policy are issued with an inactive status. Benefits under the policy may be activated at a later point in time, for example, after the policyholder's existing coverage is no longer available. In certain situations where insurance benefits begin in a dormant state, there may be an activation fee if the insurance benefits are activated within a certain number of months from the initial policy issuance date.

Exemplary Embodiments

In one exemplary embodiment of the present invention, a term life insurance policy includes a dormancy provision where benefits are issued in the active status. According to this embodiment, at the time the policy is issued, employer-sponsored life insurance is not available to the policyholder. As long as premiums associated with the insurance benefits and dormancy provision are paid, the policyholder has the option of deactivating his life insurance benefits. Thus, for example, if the policyholder changes employment and employer-sponsored life insurance becomes available, the insurance benefits under the policy with the dormancy provision may be deactivated and the policy benefits maintained in the dormant status as long as dormancy premiums are paid. According to certain embodiments, if the benefits under a policy are inactive and the policy is non-renewed, i.e., due to the death of the policyholder, a return of dormancy premiums may be made. Alternatively, if the policyholder no longer has access to life insurance, the benefits under the dormant policy may be activated, and the benefits maintained in the active status as long as premium payments are paid.

In another exemplary embodiment of the present invention, a health insurance policy includes a dormancy provision where the policy is issued with benefits in the inactive status. According to this embodiment, the policyholder initially has access to employer-sponsored or other health coverage. If the policyholder terminates employment or no longer has access to health coverage, the benefits under the dormant policy may be activated, i.e., policyholder's rights to receive reimbursement for drugs, tests, and other diagnostic services, under the policy are active. This activation, if within a certain period of time, may require an activation fee. The benefits under the policy may be maintained in the active status until the policyholder's circumstances change, e.g., an alternate insurance source becomes available, and then the policyholder may deactivate their health insurance benefits. This provides policyholders with the assurance that they may be medically insured even if their life situation changes, and although the policyholders' premiums will change with attained age and according to normal and periodic rate adjustments applied to all similarly situated insureds, they will not change due to the development of illness or disease during the period of dormancy.

A medical insurance policy with a dormancy provision, according to some embodiments, may include coverage for the policyholder and any dependents. For example, when the policy is initially issued, the insurance benefits may be automatically activated for both the policyholder and any dependents unless the policyholder requests to deactivate certain insurance benefits, e.g., benefits for one or more dependents. Alternatively, the policyholder may be required to add dependents to the policy and associated dormancy provision. In a further embodiment, if a dependent is no longer an eligible dependent under the policy, they may be required to apply for their own policy. Otherwise, the dependent may be guaranteed a new policy, e.g., in the case of death or divorce.

According to another embodiment, newborns may be automatically added to the policy upon birth, or, alternatively, the insurance company may require verification of the birth of the newborn before providing medical benefits. The dependent may receive these benefits by being added to his parent's policy, or issued his own policy. In another example, a newborn may only receive insurance benefits if the policyholder's benefits are in an active status. In another embodiment, insurance benefits for a dependent may be activated when the person is considered a dependent for purposes of other medical insurance coverage and becomes entitled to benefits under title XVII of the Social Security Act.

For preexisting conditions, a policy may include an exclusion period, such as a 12-month exclusion period, that prevents an individual from recovering expenses for his preexisting condition for 12 months after the person was added to the policy. However, for certain dormancy provision-associated policies, the 12-month exclusion period may begin to toll even if the insurance benefits for that person are in an inactive state. Thus, under certain policies having a dormancy provision, a person with a preexisting condition may not have to wait the full 12-month period from the time insurance benefits are activated in order to receive active policy insurance benefits.

The dormancy provision, according to further embodiments, remains in force until the renewal date, and may stay in force for further periods in which it is renewed. Like other types of insurance riders and policies, the renewability of the dormancy provision may be subject to conditions.

For some embodiments, the policy and associated dormancy provision may be terminated due to, for example, but not limited to: a failure to pay premiums, a request to terminate policy by the policyholder, a refusal to renew the policy by the insurance company, or death (for an individual plan). However, a dormancy policy may also be terminated for other reasons such as: failure to pay dormancy premiums for a policy with inactive benefits, the direct or indirect contribution or reimbursement (through wage adjustment or otherwise) by or on behalf of an employer for any portion of premiums or dormancy premiums, or the policyholder's employer treating the policy as part of an employer-provided insurance plan for any purpose, including tax purposes.

According to some embodiments, each time the dormancy policy changes, a data page is sent to the policyholder. A data page may include references to the policyholder's policy effective date, benefit activation date, and benefit deactivation date. Thus, each time the policyholder activates or deactivates his policy benefits, or the policy changes due to the addition or removal of a dependent, for example, a data page or insurance statement ("written notice") may be sent to the policyholder or other appropriate parties. Written notice may also be issued to a policyholder periodically, or when premium amounts change. In addition, for a dormancy policy involving medical insurance, the data page may include fields for dependent information and other policy information such as deductible amounts and benefits.

Figure 2:
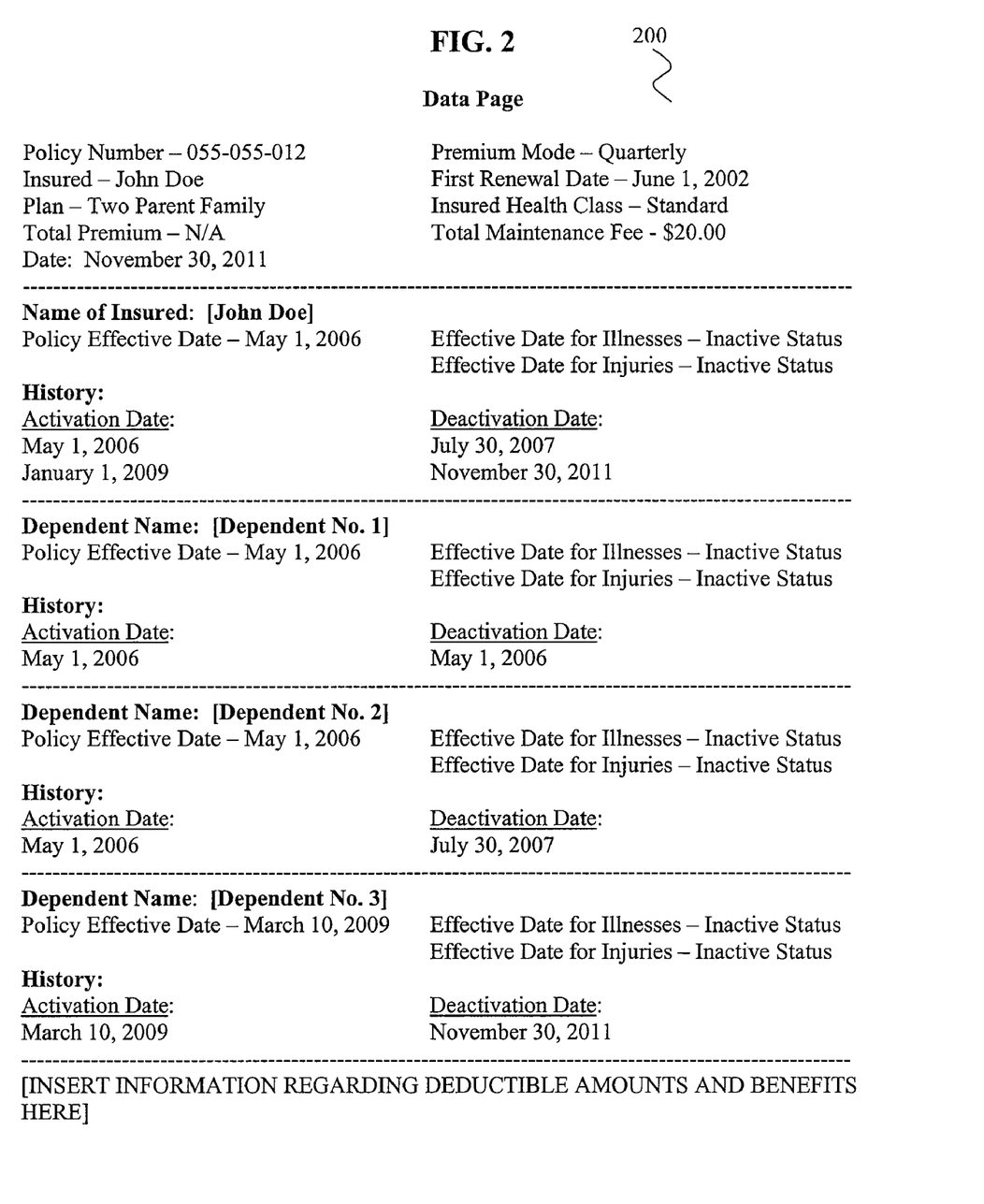
FIG. 2 depicts a data sheet for a policy having dormant health insurance benefits.

FIG. 2 is an exemplary data page 200 that may be sent to a policyholder after deactivating the benefits under his health insurance policy. Because data page 200 has a deactivation date of Nov. 30, 2011, and no subsequent activation date, it corresponds to a policy with inactive benefits. Data page 200 thus includes dormancy premiums that are required in order for the policyholder to maintain the policy benefits in the dormant state. In addition, effective dates for injury and illness indicate that the benefits under the policy are in an inactive status for both the policyholder and his dependents.

Figure 3:
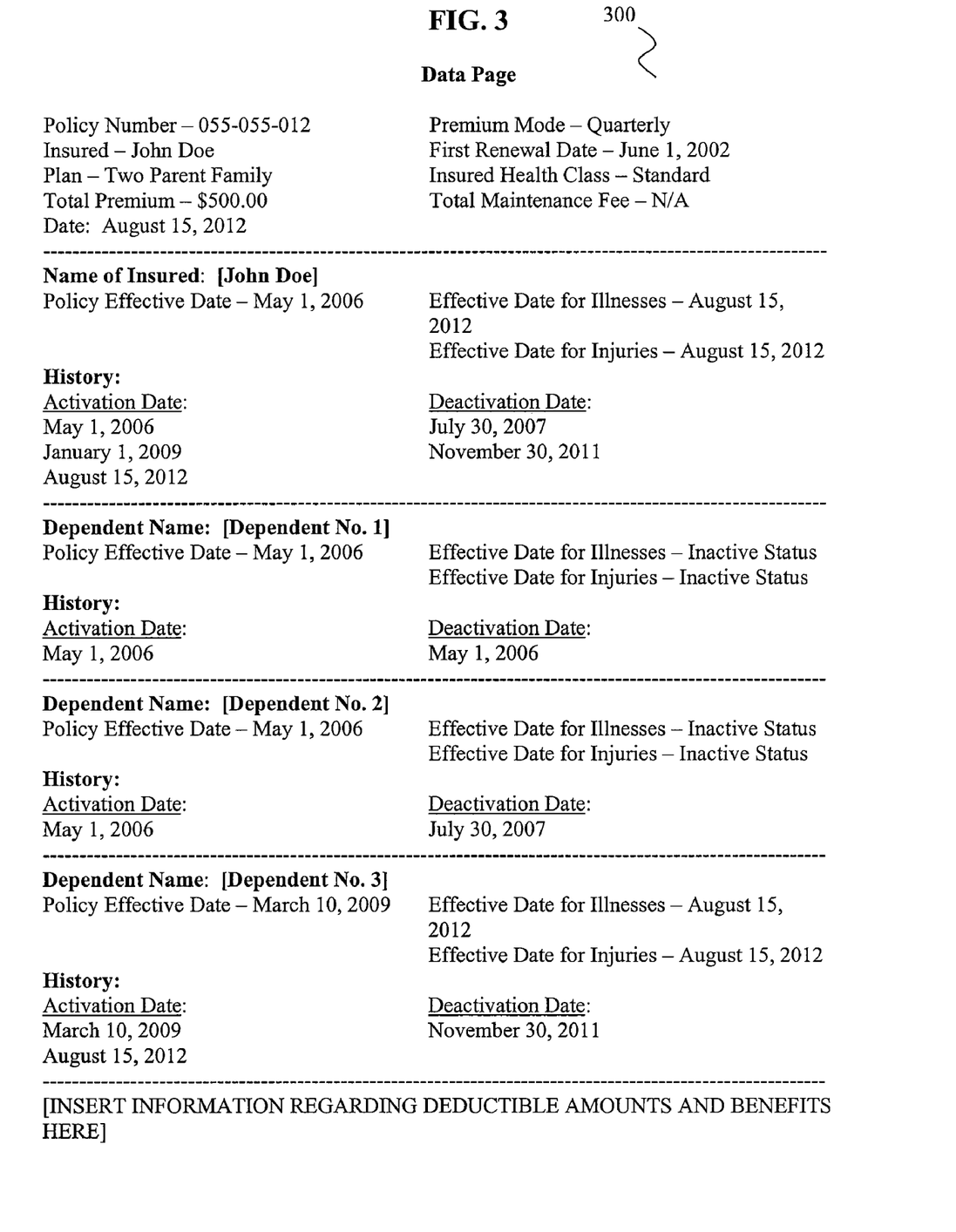
FIG. 3 depicts a data sheet for a policy with active health insurance benefits.

FIG. 3 is an exemplary data page 300 that may be provided after benefit activation. Data page 300 corresponds to a policy having active benefits as of Aug. 15, 2012 with no subsequent deactivation date. Data page 300 also includes the amount of premiums required to maintain the benefits under the policy in the active state, and an injury and illness effective date of Aug. 15, 2012 for the policyholder and dependent No. 3. Benefits for dependent 1 and 2 remain in inactive and do not have associated effective dates for injury and illness, and instead the effective dates for injury and illness are designated as having an "Inactive Status". The policyholder may choose to activate the deactivated benefits of dependent 1 and 2 at a later date. Further, in certain embodiments, dependents may also activate and deactivate their benefits at any time while the policyholder's benefits are active. According to some embodiments, if the policyholder deactivates the benefits under his policy, the benefits for each dependent covered under the policy are deactivated. Thus, for example, in FIG. 3, the policyholder deactivated his insurance benefits on Nov. 30, 2011, and dependent 3, the only dependent with active insurance benefits during the time preceding, also has a deactivation date of Nov. 30, 2011.

An example embodiment of how a policy with a dormancy provision may operate in relation to a policyholder and his dependents follows. A policyholder enrolls himself and family in a policy having a policy effective date of Feb. 1, 2010. The policyholder pays the premiums for his entire family. On Jun. 1, 2010, the policyholder is hired by corporation Y and is provided with insurance coverage. The policyholder notifies the insurance company on Jun. 1, 2010 to deactivate the policy's benefits. In this situation, the policy benefits for the policyholder and his dependents are all inactive. The insurance company issues an updated data sheet to the policyholder indicating that the benefits associated with the policy are inactive as of Jun. 1, 2010. The policyholder pays the dormancy premium to maintain the policy with benefits in the inactive state. On Jan. 20, 2013, the policyholder terminates his employment and becomes self-employed, and notifies the insurance company that the policy benefits should be activated. The insurance company issues an updated data sheet that indicates that benefits for the policyholder and his dependents have an activation date of Jan. 20, 2013.

The following example illustrates how a medical insurance policy with a dormancy provision would operate in relation to a dependent of a policyholder, according to some embodiments. A dependent is added to the policyholder's policy on the policy effective date, Jan. 1, 2009. The dependent is hired by company X on May 15, 2009, and company X provides full medical insurance to the dependent. The policyholder or the dependent notifies the insurance company of his desire to deactivate the benefits associated with dependent. An updated data page is sent to the policyholder indicating that the dependent has a deactivation date of May 15, 2009. The policyholder continues to pay premiums for his portion of benefits, and pays dormancy premiums for the dependent's portion of benefits. In the future, the dependent obtains a new job and is no longer covered under company X's medical insurance coverage. On Dec. 10, 2009, either the policyholder or the dependent notifies the insurance company of his desire to activate the dependent's medical benefits. An updated data sheet is sent to policyholder indicating the change in the dependent's status to show that the dependent's benefits have an activation date of Dec. 10, 2009. Premium payments are made to the insurance company for both the policyholder and the dependent as if the dependent had always been covered under the policy.

Risks and Considerations associated with Dormancy Policies

Insurance policies with dormancy provisions, according to some embodiments, include a certain amount of risk associated with anti-selection opportunities created by characteristics of the dormancy product and associated with expense issues.

Anti-selection opportunities created by a medical insurance policy with a dormancy provision may include attracting those individuals having a greater propensity for high cost medical conditions due to the plan's flexibility with activation and deactivation. In addition, policyholders with inactive benefits having low or no employer coverage may activate the insurance benefits under their policy when health situations arise or appear likely. Each of the above mentioned issues may have the impact of raising general morbidity levels under the product.

Additional anti-selection opportunities may include improper deactivation of the policy. For example, when a policyholder's health outlook is favorable, he may choose to deactivate the benefits under his policy. Further, a healthy policyholder may allow coverage gaps to occur by opting out of employer coverage. As a result, revenues under the policy may be reduced with a less than proportionate reduction in claims.

In contrast to individual medical plans that typically have more favorable claim experience during early years of the policy soon after insureds have passed through the medical underwriting process, and less favorable experience in later years after the underwriting impact has worn off and anti-selective lapse activity has started to occur; for the policy having a dormancy provision, there may be a higher frequency and length of deactivations during early policy years and activations during later years which may increase claims relative to revenue over the life of the product.

Moreover, risks associated with the policy with the dormancy provision concerning expense issues may involve the difficulty of spreading out the costs of significant front-end expenses associated with distribution, underwriting, and issue of a plan due to the inherent reduction of revenue when the dormancy period runs. Additional costs are also associated with dormancy policies because administrative costs are increased due to tracking dormancy status, application of appropriate billing and claims adjudication based on status, and verification that activation and deactivation requirements are met.

The risks described above may be managed through a combination of underwriting, product design, and pricing.

According to some embodiments, full medical underwriting may be required at or before the date the dormancy policy is issued. The underwriting may be identical or similar to other medical expense applications without dormancy provisions. Further, in some embodiments, no additional underwriting is done at subsequent activation and deactivation events. In certain embodiments, there may be additional underwriting done at subsequent activation and deactivation events. This may provide the policyholder the assurance that they will be insured regardless of their health status.

In addition, the policy may be designed with activation and deactivation requirements. For example, some activation requirements may include: prohibiting significant gaps in coverage during the preceding dormancy period, voluntary or involuntary loss of existing insurance coverage, or for policies in an initial dormant state, there may be a requirement of a minimum dormant period prior to activation or else an activation fee within a certain period of time from the initial dormant state. Some deactivation requirements may include: proof of employer coverage, and for products issued in the initial active status, a minimum period prior to deactivation. According to some embodiments, the policy may prohibit the policyholder to enrich his benefits after the policy issues, but may allow the policyholder to elect benefits of an alternative or lesser value at activation, during a period of active benefits, or at any time.

The policy's rate structure for dormancy premiums charged for the dormancy feature may closely parallel the premium structure for the underlying medical insurance plans, which vary by characteristics such as insured age and gender, health rating class, effective date and duration since issue, geographic area and provider network, plan and optional benefits selected. In addition, there may be fees associated with early activation, early deactivation, or multiple activations/deactivations in excess of a particular threshold over the policy lifetime or within a specified period.

Dormancy premiums may also vary by current benefit status (active vs. inactive) and status at inception. Dormancy premiums may be higher when benefits are deactivated than when activated. However, in order to maintain profitability of the policy regardless of status, the cost of the dormancy premiums for the policy with active benefits and the policy with inactive benefits may only be slightly different. Dormancy premiums may be higher for a plan that initially issues with inactive benefits.

At policy inception and during periods when benefits are activated, common expense elements are present related to underwriting and issue, distribution, sales, billing, claims, customer service, and various overhead items. However, with policies having a dormancy provision, other expenses may also need to be considered that are related to changing and tracking dormancy status, and verifying qualifications for a change in status.

According to certain embodiments, the pricing of insurance premiums is expected to be similar or identical for policies with and without the dormancy provision. Therefore, most or all of the cost differences due to expenses and antiselective morbidity may need to be recognized within the development of the dormancy premiums.

In addition, according to some embodiments, for policies issued under an initial dormancy period, it may be necessary to establish statutory active life reserves. Such reserves may be related to the portion of initial dormancy premiums, which, together with investment income on the reserve balance, may fund higher claims in later durations (subsequent to benefit activation).

The methods and systems according to the present invention may be implemented using paper, paperless, and/or computer methods. In some implementations, various combinations of software and hardware may be used, as would be apparent to those of skill in the art and as desired by the user. In addition, the present invention may be implemented in conjunction with a general purpose or dedicated computer system having a processor and memory components.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A computer-implemented system for generating insurance policy data associated with an insurance policy providing insurance coverage for one or more entities, comprising:
a computer processor programmed to:
receive underwriting data relating to an entity to be insured;
generate insurance policy data based upon the underwriting data, wherein the insurance policy data defines terms associated with an insurance policy for providing insurance coverage to the entity to be insured, wherein the insurance policy data defines an active coverage state and coverage and benefits to be provided to the entity during the active coverage state, and wherein the insurance policy data further defines a dormant state during which no coverage or benefits are to be provided to the entity, terms under which the dormant state can be commenced, and terms under which the active coverage state can be commenced to terminate the dormant state;
determine an active coverage premium that the entity is required to pay during the active coverage state to maintain active coverage under the insurance policy using the underwriting data;
determine a first dormancy premium that the entity is required to pay during the active coverage state to maintain the option of exercising the dormancy provision in the insurance policy using the underwriting data; and
determine a second dormancy premium that the entity is required to pay during the dormant state to maintain the option of recommencing the active coverage period using the underwriting data; and
an electronic database for storing the insurance policy data, the active coverage premium, and the first and second dormancy premium.

2. The system according to claim 1, wherein the active coverage state precedes the dormant state.

3. The system according to claim 1, wherein the dormant state precedes the active coverage state.

4. The system according to claim 1, wherein the first dormancy premium is less than the second dormancy premium.

5. The system according to claim 1, wherein the insurance policy data further defines one or more fees associated with commencement or termination of the active coverage state.

6. The system according to claim 1, wherein the underwriting data includes age and gender of the entity, health rating class of the entity, geographic area of the entity, and the provider network, plan and optional benefits of the entity.

7. The system according to claim 1, wherein the insurance policy is a health insurance policy.

8. The system according to claim 1, wherein the insurance policy is a life insurance policy.

9. The system according to claim 1, wherein the insurance policy is a property insurance policy.

10. A computer-implemented method for generating insurance policy data associated with an insurance policy providing insurance coverage for one or more entities, comprising:

receiving underwriting data relating to an entity to be insured at a computer processor;

using the computer processor to generate insurance policy data based upon the underwriting data, wherein the insurance policy data defines terms associated with an insurance policy for providing insurance coverage to the entity to be insured, wherein the insurance policy data defines an active coverage state and coverage and benefits to be provided to the entity during the active coverage state, and wherein the insurance policy data further defines a dormant state during which no coverage or benefits are to be provided to the entity, terms under which the dormant state can be commenced, and terms under which the active coverage state can be commenced to terminate the dormant state;

using the computer processor to determine an active coverage premium that the entity is required to pay during the active coverage state to maintain active coverage under the insurance policy using the underwriting data;

using the computer processor to determine a first dormancy premium that the entity is required to pay during the active coverage state to maintain the option of exercising the dormancy provision in the insurance policy using the underwriting data;

using the computer processor to determine a second dormancy premium that the entity is required to pay during the dormant state to maintain the option of recommencing the active coverage period using the underwriting data; and storing the insurance policy data, the active coverage premium, and the first and second dormancy premium in an electronic database.

11. The method according to claim 10, wherein the active coverage state precedes the dormant state.

12. The method according to claim 10, wherein the dormant state precedes the active coverage state.

13. The method according to claim 10, wherein the first dormancy premium is less than the second dormancy premium.

14. The method according to claim 10, wherein the insurance policy data further defines one or more fees associated with commencement or termination of the active coverage state.

15. The method according to claim 10, wherein the underwriting data includes age and gender of the entity, health rating class of the entity, geographic area of the entity, and the provider network, plan and optional benefits of the entity.

16. The method according to claim 10, wherein the insurance policy is a health insurance policy.

17. The method according to claim 10, wherein the insurance policy is a life insurance policy.

18. The method according to claim 10, wherein the insurance policy is a property insurance policy.

* * * * *